United States Patent [19]

Piersol

[11] 4,447,560

[45] May 8, 1984

[54] LOW DENSITY FIBROUS SHEET MATERIAL

[75] Inventor: Jay L. Piersol, Lancaster, Pa.

[73] Assignee: Armstrong World Industries, Inc., Lancaster, Pa.

[21] Appl. No.: 375,395

[22] Filed: May 6, 1982

[51] Int. Cl.³ .............................. C08J 9/28; C08J 9/30
[52] U.S. Cl. ..................................... 521/68; 521/139; 521/140
[58] Field of Search .................................. 521/68, 92

[56] References Cited

U.S. PATENT DOCUMENTS

| 2,140,062 | 12/1938 | Talalay | 521/68 |
|---|---|---|---|
| 2,140,063 | 12/1938 | Talalay | 521/68 |
| 2,194,036 | 3/1940 | Talalay | 521/68 |
| 2,498,785 | 2/1950 | Bennett et al. | 521/68 |
| 2,517,753 | 8/1950 | Ximenez et al. | 521/68 |
| 2,568,866 | 9/1951 | Osterhof | 521/68 |
| 2,809,173 | 10/1957 | Dereniuk | 521/68 |
| 2,809,174 | 10/1957 | Dereniuk | 521/68 |
| 2,832,997 | 5/1958 | Bristol | 521/68 |
| 2,893,962 | 7/1959 | Bartell | 521/68 |
| 3,489,827 | 1/1970 | Mueller et al. | 521/68 |
| 3,499,811 | 3/1970 | Clarke | 521/68 |
| 3,743,612 | 7/1973 | Vial | 521/68 |

*Primary Examiner*—Morton Foelak

[57] ABSTRACT

Disclosed is a method of producing a low density fibrous composition that is suitable for use as an insulation material. The method comprises first forming an aqueous mixture comprising fibers and a synthetic rubber binder for the fibers and a foamed detergent to a consistency ranging from about 4 to about 15 weight percent solids. The mixture is then foamed to homogeneously suspend all of its components therein and then dried to form the low density fibrous composition.

7 Claims, No Drawings

LOW DENSITY FIBROUS SHEET MATERIAL

BACKGROUND OF THE INVENTION

Low density insulation material is well known in the art. This material is typically formed via the so-called "dry lay" process, which generally comprises first forming an insulating material, such as fiberglass, in air and thereafter spraying a thermosetting resin binder on such material. In this process only low levels of binder can be employed.

Although the dry lay process produces very satisfactory low density insulation material, the process is limited in that, as mentioned above, only low levels of binder can generally be employed. In addition, the process is ineffective in its employment of fillers, which tend to separate out to give a non-homogeneous product.

SUMMARY OF THE INVENTION

The present invention involves a low density fibrous composition that is formed from an aqueous, homogeneous system. The aqueous system can utilize higher levels of binder than are used in the typical dry lay process, with the result that the final product has the potential of serving a broader spectrum of needs than the product formed by a standard dry lay process, since the strength of the product of the present invention can be varied with binder levels. In addition, the present aqueous system can effectively use fillers to provide bulk, conductivity, color and fire resistance to the final product. Finally, the present process is additionally advantageous in that it can be run on standard paper-making equipment that does not lend itself to the dry lay process.

The composition of the present invention is produced by forming an aqueous mixture comprising fibers, a synthetic rubber binder for the fibers and a foamable detergent. The mixture is foamed such as by agitation, to form a homogeneous suspension and thereafter dried to form the low density composition. Alternatively, the composition may be formed via a two step procedure whereupon there is formed an aqueous fibrous slurry comprising fibers and a synthetic rubber binder for the fibers, which slurry is then added to a solution of a foamable detergent in water. The resulting mixture is foamed to homogeneously suspend the fibrous slurry therein and thereafter dried to form the low density fibrous composition. If desired, the mixture may be formed into sheets prior to the drying operation to thereby form a low density fibrous sheet material.

The low density fibrous material of the present invention is most preferably formed by a two step beater saturation process which comprises forming an aqueous fibrous slurry comprising fibers, a synthetic rubber binder, a soluble salt selected from the group consisting of aluminum salts, ferric salts, and stannic salts, and a sufficient amount of an alkaline hydroxide to provide a slurry pH within the range of from about 6 to about 10, said alkaline hydroxide serving to convert said soluble salt to a water insoluble hydroxide. The slurry is then added to a solution of a foamable detergent in water. The resulting mixture is foamed to homogeneously suspend the fibrous slurry therein. Finally, the mixture is dried to form the low density fibrous material.

DETAILED DESCRIPTION OF THE INVENTION

According to this invention there is provided, via an aqueous slurry system, a low density fiber material which exhibits excellent insulation properties. The material is produced in a preferred embodiment by first forming an aqueous fibrous slurry comprising fibers and a synthetic rubber binder for the fibers, adding the slurry to a solution of a foamable detergent in water, and foaming the resulting mixture, which will have a consistency of from about 4 to about 15 wt % solids, to homogeneously suspend the fibrous slurry therein. After being formed, the mixture is then dried to form the low density fibrous material. To produce the material in accordance with the most preferred embodiment of this invention an aqueous slurry comprising suitable fibers and, if desired, at least one organic filler, is mixed with from about 2 to about 40 parts by weight per 100 parts by weight of the fiber of a soluble salt selected from the group consisting of aluminum salts, ferric salts, and stannic salts followed by the addition of sufficient amount of an alkaline hydroxide to provide a slurry pH within the range of from about six to about ten and preferably from about 7 to about 8. The alkaline hydroxide converts the soluble salts to a water insoluble hydroxide. A synthetic rubber binder is then added to the mixture and stirred until the binder precipitates onto the fibers. Water is removed from the resulting slurry. The resulting wet lap is then mixed in a solution of detergent in water to form a mixture having a consistency of from about 4 to about 15 wt % solids. The resulting mixture is foamed to form a homogeneous mixture. The mixture, after being formed, is dried, preferably in a hot-air oven, to form the fiber sheet, which will have a density ranging from about 2.0 to about 12.0, and most preferably from about 2 to about 6, $lb/ft.^3$.

Any fibers which can be utilized in conventional beater saturation processes can be employed in the present invention. The fibers will preferably have nominal lengths within the range of from about 0.5 to about 13 mm, and most preferably from about 1 mm to about 7 mm, and nominal diameters within the range of from about 3 microns to about 16 microns, and most preferably from about 4 to 8 microns.

Fibers longer than those specified above may, at the option of the individual practicioner of this invention, be added to water-soap solution or to the mixture after it has been foamed. The addition of such fibers would tend to reinforce the low density material. In any case, no more than about 15 wt % of such reinforcing fibers, based on the weight of the fibers utilized in the aqueous slurry, can advantageously be added to the foamed mixture. In order to maximize reinforcing effects, such fibers should be from about 6 mm to about 26 mm in length.

Examples of suitable fibers that may be added both before and after the mixture is foamed include, for example, mineral wool, ceramic fibers, cellulose fibers, asbestos fibers and aromatic polyamide fibers. Such fibers may be used separately or in combination. Suitable ceramic fibers include Babcock and Wilcox's chopped ceramic fiber available under the trade designation "Kaowool," which is an alumina-silica ceramic fiber that has a melting point of 3200° F., a specific gravity of 2.56, a tensile strength of $1.9 \times 10^5$ $lbs/in^2$ and a modulus of $16.8 \times 10^6$ $lbs/in^2$.

The term aromatic polyamide fibers is used herein to signify a family of fibers which have been granted the generic name "aramid" by the Federal Trade Commission. Particularly suitable aromatic polyamide fibers include those available from E. I. duPont deNemours and Company under the trade designations "Kevlar," "Kevlar 29," and "Kevlar 29" and "Nomex." Kevlar 49 aromatic polyamide fiber has a tensile strength of 400,000 lb/in$^2$, a modulus of 18,000,000 lb/in$^2$ and a density of 1.44 g/cm$^3$. Kevlar 29 aromatic polyamide fiber has a tensile strength of 400,000 lb/in$^2$, a modulus of 8,500,000 lb/in$^2$ and a density of 1.44 g/cm$^3$. Nomex aromatic polyamide fiber has a density of 1.38 g/cm$^2$ and a tensile strength of 95,000 lb/in$^2$.

The composition of this invention will contain from about 5 to about 50 parts by weight of a synthetic rubber binder per every 100 parts of fiber. Any synthetic rubber binder which is used in standard beater saturation processes may be employed in the composition of the present invention. In a preferred embodiment of the present invention the fibers are bound together by a synthetic rubber which is deposited on the fibers by precipitation from a latex of the synthetic rubber. Any suitable synthetic anionic-type rubber latex can be employed—including vinylidene chloride latex, nitrile rubber, styrene butadiene latexes, carboxylated styrene butadiene latexes, carboxylated acryonitrile butadiene, polychloroprenes (neoprene), and the like. These latexes can be used singularly or in combination.

Particularly suitable rubber latex include, for example, Reichhold Corp.'s Tylac 4700A, an acryonitrile butadiene latex (which contains 42% solids and has a pH of from 10 to 10.5, and weight per U.S. gallon of 8.33 lbs); Dow Chemical Corporation's XD 30175.00, a vinylidene chloride-butadiene latex (which contains 47% solids and has a pH of from about 7.2 to 8.2 and weight per U.S. gallon of 9.2 lbs; and DuPont's Neoprene 645, a polychloroprene latex (which contains 59% solids and has a pH of from about 11 to 12 and weight per U.S. gallon of 9.33 lbs.

Examples of the inorganic filler(s) which may be added to the aqueous fiber slurry include paper filler clay, cork, wollastonite, talc, calcium carbonate, mica, and diatomaceous earth. Particularly suitable fillers include wollastonite of P-4, P-1 or C-1 grade, all commercially available from Interpace Company, kaolin paper filler clays designated "Hi-Opaque clay", commercially available from Freeport Kaolin Clay Company, "Narvon" paper filler clay, commercially available from Combustion Engineering Inc., and "Klondyke" paper filler clay or "Klondyke KWW" paper filler clay, both commercially available from Engelhart Minerals and Chemicals Corporation. The inorganic fillers employed must be chemically inert in the sense that they should not interfere with the precipitation of the rubber latex onto the fibers. In any event, when the fillers are utilized in the most preferred process of the present invention, they are to be added to the aqueous fiber slurry prior to the addition of the soluble salt and the alkaline hydroxide to the rubber slurry. The amount of filler(s) added will be dependent on the amounts and types of rubber binder and fibers employed and on the needs of the individual practitioners of the invention.

Any detergent that is capable of producing a foam when agitated in water is generally suitable for use in the present invention. The term "detergent" as used herein also encompasses soaps that are capable of being foamed. An example of a suitable detergent is sodium dodecylbenzene sulfonate, which is available from Stephen Chemical Co. under the trade name Biosoft D-40.

Other suitable detergents include Ultrawet 60L which is available from the Arco Chemical Company and is classified as a linear alkylate sulfonate organic salt, and Mearlcel 2336, is available from The Mearl Corporation and is a sodium dodecyl benzene sulfonate.

The amount of detergent employed in the detergent/water solution in the invention's preferred method will normally range from about 5 to about 20 g of detergent for every 1500 cc of water employed in the solution. In any event, a sufficient amount of detergent should be employed so that the aqueous mixture will be foamed to a volume that is preferably from about 3 to about 5 times its original volume.

Whether a one or two step process is employed to form the composition of the present invention, the composition prior to being foamed will normally have a consistency within the range of from about 4 to about 15, and most preferably from about 5 to about 10, weight percent solids. Thus, it may be necessary, in the two-step method, to dewater the aqueous slurry prior to adding it to the soap-water solution so that the resulting mixture will have the proper consistency. The upper limit for the consistency will depend to a large extent on the method and the equipment that will be utilized to agitate, and thereby foam, the mixture. For example, if the mixture has a very high consistency (above 15) agitation sufficient to generate foam may be achieved only with very great difficulty. By contrast, at comparatively low consistencies, (approximately 2 and below), the mixture may have a tendency to stratify thus preventing the formation of a homogeneous mixture.

The water utilized in the aqueous slurry and the detergent/water solution can be of any temperature. However, it is preferred to use water at temperatures ranging from about 100° F. to about 120° F. Such temperatures serve to improve the drainage rate of the original aqueous slurry and thus facilitates the dewatering process. In the foaming procedure, the use of such hot water will serve to generate more foam and thus produce a lower density product.

The aqueous fiber slurry will preferably contain about 1 to about 4 parts by weight of a latex antioxidant per 100 parts of the synthetic rubber binder weight. Any latex antioxidant that is commonly used in beater saturation process is suitable for use herein, as long as it is compatible with the particular latex being employed. A particularly suitable latex antioxidant is designated "Flectol H," commercially available from Monsanto Industrial Chemicals Company. Flectol H is polymerized 2,2,4-trimethyl-1,2-dihydro quinoline. Other suitable antioxidants include B. F. Goodrich Chemical Company's "Agerite White" antioxidant, which is sym-Di-beta-naphthyl-para-phenylenediamine. The aqueous fiber slurry may also contain latex dispersing agents, coloring agents, biocides and the like, which are well known to those skilled in the art, according to the needs of the individual practitioner of the invention. One example of a suitable latex dispersing agent is sodium salt condensed naphtalene sulfonic acid, sold by Rohm & Haas under the trade name Tamol N.

The process of the present invention can be carried out on a large scale on a variety of equipment such as, for example, standard papermaking machines which include a fourdrinier former, vacuum boxes and a flat bed dryer.

The following examples demonstrate the preparation of low density, fibrous sheet materials of this invention.

EXAMPLE I

Ingredients 200 g mineral wool
325 cc 10% aluminum sulphate
25 cc 28% ammonium hydroxide
20 cc 10% Tamol N
142.8 g synthetic rubber latex (Tylac 4700A, 42 wt % solids)

The mineral wool was added to a mixing vessel containing about 12 liters of heated tap water (100° F.). The contents of the mixing vessel were slurried for about 2 minutes to assure full dispersion of the ingredients at 1.6 consistency. Next, the total amount of aluminum sulfate was added with stirring for about two minutes, followed by the addition of ammonium hydroxide to a slurry pH of about 7 to 7.5. The total amount of synthetic rubber latex was added with stirring for about 5 minutes until the latex precipitated, that is, the latex deposited on the fibers thus serving as a drainage aid and a binder for the fibers.

The resulting slurry was formed into a hand sheet using a conventional Williams hand sheet mold, and was then left to free drain to remove excess water. The resulting slurry contained approximately 50% water, and was then added to a solution of 10 cc (10 g) detergent (Biosoft D-40) in 3000 cc tap water (100° F.) to form a mixture having a consistency of 8.7 percent solids. The mixture was then vigorously agitated by stirring to generate foam.

The slurry was homogeneously suspended in the foamed mixture, which was then formed in a sheet mold, and air oven dried at 300° F. to substantially remove all moisture and to thereby form a homogeneous sheet having a density of 3-4 lbs/ft$^3$ and a moisture content of approximately 3%.

EXAMPLE II

Ingredients 133 g cleaned mineral wool
150 cc 10% aluminum sulphate
15 cc ammonium hydroxide
1.2 g Flectol H
84.8 g synthetic rubber latex (Dow XD 30175.00, 47.2 wt % solids)

The mineral wool was added to a mixing vessel containing about 8 liters of heated tap water (110° F.). The contents of the mixing vessel were slurried for about 2 minutes to assure full dispersion of the ingredients at 1.6 consistency. Next, the total amount of aluminum sulfate was added with stirring for about two minutes, followed by the addition of ammonium hydroxide to a slurry pH of about 7 to 7.5. The total amount of synthetic rubber latex was added with stirring for about 5 minutes until the latex precipitated.

The resulting slurry was formed into a hand sheet and was then left to free drain to remove excess water. The resulting slurry contained approximately 50% water, and was then added to a solution of 9 cc (9 g) detergent (Biosoft D-40) and 13.3 g of ¼" reinforcing glass fibers (Owens Corning DE 670-6) in 3000 cc tap water (100° F.) to form a mixture having a consistency of 6.2 percent solids. The mixture was then vigorously agitated by stirring to generate foam.

The slurry was homogeneously suspended in the foamed mixture; which was then formed in a sheet mold, and air oven dried at 300° F. to substantially remove all moisture and to thereby form a homogeneous sheet having a density of 3.5 lbs/ft$^3$ and a moisture content of approximately 3%.

EXAMPLE III

The process of Example II was repeated exactly, except that 67.8 gms of Neoprene 654 synthetic rubber latex were employed. The resulting homogeneous sheet had a density of 3.5 lbs/ft$^3$ and a moisture content of approximately 3%.

What is claimed is:

1. A method of forming a low density fibrous sheet material which method comprises forming an aqueous slurry that comprises fibers, a soluble salt selected from the group consisting of aluminum salts, ferric salts and stannic salts, and a sufficient amount of an alkaline hydroxide to provide a slurry pH within the range of from about 6 to about 10, said alkaline hydroxide serving to convert said soluble salt to a water insoluble hydroxide; depositing a synthetic rubber binder on said fibers to form rubber-coated fibers; adding the resulting fibrous slurry to a solution of a foamable detergent in water; foaming the resulting mixture, which has a consistency of from about 4 to about 15 weight percent solids, to homogeneously suspend the fibrous slurry therein; and drying the mixture to thereby form the low density fibrous material wherein from about 5 to about 50 parts by weight of synthetic rubber binder are employed for every 100 parts of fiber.

2. The method of claim 1 wherein the fibers are mineral wool.

3. The method of claim 1 wherein the synthetic rubber binder is a synthetic anionic-type rubber latex.

4. The method of claim 1 wherein the alkaline hydroxide is ammonium hydroxide.

5. The method of claim 1 wherein the soluble salt is aluminum sulfate.

6. The method of claim 1 wherein the aqueous slurry additionally contains at least inorganic filler.

7. A method of forming a low density fibrous sheet insulation material which method comprises forming an aqueous slurry that comprises mineral wool fibers, a soluble salt selected from the group consisting of aluminum salts, ferric salts and stannic salts, and a sufficient amount of an alkaline hydroxide to provide a slurry pH within the range of from about 6 to about 10, said alkaline hydroxide serving to convert said soluble salt to a water insoluble hydroxide; depositing a synthetic anionic-type rubber latex binder on said fibers to form rubber-coated fibers; adding the resulting fibrous slurry to a solution of a foamable detergent in water; foaming the resulting mixture, which has a consistency of from about 5 to about 15 weight percent solids, to homogeneously suspend the fibrous slurry therein; forming the mixture into sheets and drying the sheets to thereby form the low density fibrous insulation sheet material wherein from about 5 to about 5 parts by weight of synthetic rubber binder are employed for every 100 parts of fiber.

* * * * *